United States Patent
Garcia et al.

(10) Patent No.: US 9,429,645 B2
(45) Date of Patent: Aug. 30, 2016

(54) PROGRAMMABLE WAVELET TREE

(71) Applicant: Texas Instruments Incorporated, Dallas, TX (US)

(72) Inventors: Domingo G. Garcia, Plano, TX (US); Mohamed Mansour, Richardson, TX (US); Murtaza Ali, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/684,777

(22) Filed: Apr. 13, 2015

(65) Prior Publication Data

US 2015/0219754 A1    Aug. 6, 2015

Related U.S. Application Data

(62) Division of application No. 13/603,217, filed on Sep. 4, 2012, now Pat. No. 9,030,908.

(60) Provisional application No. 61/538,433, filed on Sep. 23, 2011.

(51) Int. Cl.
  *G01S 7/00* (2006.01)
  *G01S 7/52* (2006.01)
  *G06F 17/14* (2006.01)

(52) U.S. Cl.
  CPC ............... *G01S 7/52* (2013.01); *G06F 17/148* (2013.01)

(58) Field of Classification Search
  CPC ......... G06F 17/148; A61B 8/14; H04W 8/00
  See application file for complete search history.

(56) References Cited

U.S. PATENT DOCUMENTS

| | | | | |
|---|---|---|---|---|
| 2009/0028079 A1* | 1/2009 | Song | ..................... | H04L 1/0041 370/310 |
| 2009/0067319 A1* | 3/2009 | Dapper | ................... | G06F 17/14 370/210 |
| 2009/0074052 A1* | 3/2009 | Fukuhara | ............... | H04N 19/63 375/240.01 |
| 2009/0316568 A1* | 12/2009 | Harris | ..................... | H04L 1/004 370/203 |
| 2010/0331689 A1* | 12/2010 | Wegener | .................. | A61B 8/06 600/443 |
| 2012/0243618 A1* | 9/2012 | Suh | ........................ | H04H 20/55 375/240.26 |

FOREIGN PATENT DOCUMENTS

| | | |
|---|---|---|
| CN | 1640024 A | 7/2005 |
| CN | 101006646 A | 7/2007 |
| CN | 101617473 A | 12/2009 |
| JP | 2005204715 A | 8/2005 |

* cited by examiner

*Primary Examiner* — Luke Ratcliffe
*Assistant Examiner* — Hovhannes Baghdasaryan
(74) *Attorney, Agent, or Firm* — John R. Pessetto; Frank D. Cimino

(57) ABSTRACT

An apparatus is provided. In the apparatus, a demultiplexer is configured to receive an input signal, and each of a plurality of sample buffers are coupled to the demultiplexer. A first multiplexer is coupled to each of the sample buffers. A filter is coupled to the first multiplexer. A bypass delay circuit is coupled to the first multiplexer, and a second multiplexer is coupled to the filter and the bypass delay circuit.

8 Claims, 5 Drawing Sheets

PROGRAMMABLE WAVELET TREE

CROSS-REFERENCE TO RELATED APPLICATIONS

This application is a divisional of prior application Ser. No. 13/603,217, filed Sep. 4, 2012, currently pending;

Which claims priority to U.S. Patent Application Ser. No. 61/538,433, which was filed on Sep. 23, 2011 and which is hereby incorporated by reference for all purposes.

TECHNICAL FIELD

The invention relates generally to a wavelet tree and, more particularly, to a programmable wavelet tree.

BACKGROUND

Ultrasound wands have become commonplace in hospitals and other medical facilities. The ultrasound wand is usually part of a diagnostic system that allows a physician to employ noninvasive imaging techniques to view internal organs and so forth. Ultrasonic wand (like many other applications) produces a large quantity of data that is generally processed in near real-time to generate useful results. To do this, the corresponding electronics within the system (e.g., ultrasonic diagnostic system) tend to be complicated and may be specific to a measuring instrument (e.g., ultrasonic wand).

Turning to FIG. 1, an example of a portion of an ultrasonic imaging system 100 can be seen. As shown in this example, transducers 102 (i.e., within an ultrasonic wand) are able to generate imaging data from a target (e.g., patient) for the analog front end (AFE) 104. The AFE 104 generally includes analog-to-digital converters (ADCs), amplifiers, and other components used for digitization. There may, for example, be eight output channels from the AFE 104. The digitized output from the AFE 104 can then be applied to a discrete cosine transform (DCT) circuit 106 (which can be referred to as an input circuit with AFE 104 and/or transducers 102), and the output from DCT circuit 106 can then be applied to the compression circuit 107. This compression circuit 107 is generally comprised of a wavelet tree formed of packet transformation circuits 108-1 to 108-N, which can compress the digitized image data or signals. This compressed signal or signals from compression circuit 107 can then be quantized and serialized by circuit 110 to as to provide serial data over the output channel to, for example, double data rate (DDR) synchronous dynamic random access memory (SDRAM).

Typically, the packet transformation circuits 108-1 to 108-N (which can be seen in greater detail in FIG. 2 and is labeled 108) perform filtering operations on incoming data streams. The packet transform circuit 108 is typically formed of a "wavelet tree" that includes cascaded analysis circuits 112-1,1 to 112-D,$2^D$. For this example, there are D levels for the wavelet tree. Each of these analysis circuits 112-1,1 to 112-D,$2^D$ (which can be seen in greater detail in FIG. 3 and is labeled 112) includes filters 202 and 206 (which can be represented by functions H(z) and G(z), respectively), decimators or downsamplers 204 and 208, and multiplexer 210. In this configuration, each filter 202 and 206 generates one output, filtered sample for every two input samples, meaning that the filters 202 and 206 are alternated between adjacent samples. These filters 202 and 206 can, for example, be quadrature mirror filters or a finite impulse response (FIR) filters having several (e.g., 10) taps. The outputs are then downsampled or decimated (e.g., by 2) with decimators 204 and 208 and multiplexed with multiplexer 210. Descriptions of such implementations can be found in U.S. Patent Pre-Grant Publ. Nos. 2011/0096621 and 2011/0222791, where each is incorporated by reference for all purposes.

One issue with system 100 (and packet transform circuit 108 in particular) is that the shape of the wavelet tree can vary depending on the configuration of the transducers 102 (e.g., wand). In other words, to achieve desirable or optimal performance, the shape of wavelet tree (of packet transform circuit 108) is varied to accommodate the transducers 102 (e.g., wand). In FIGS. 4 and 5, two example shapes or configurations for the wavelet tree of packet transform circuit 108 (which are labeled 108-A and 108-B, respectively) can be seen. As shown, circuit 108-A is a full wavelet tree, while circuit 108-B is a partial tree. Conventionally, this is achieved by building hardware structures (i.e., wavelet trees) that correspond to each set of transducers 102 (e.g., wand) so as to reduce hardware overhead. It would be desirable to have a programmable compression circuit 107, but this has not yet been achieved largely because of the difficulty in "aligning" output data from the wavelet trees for a large number of partial tree configurations.

Therefore, there is a need for a programmable wavelet tree.

SUMMARY

In accordance with the present invention, an apparatus is provided. The apparatus comprises a demultiplexer that is configured to receive an input signal; a plurality of sample buffers, wherein each sample buffer is coupled to the demultiplexer; a first multiplexer that is coupled to each of the sample buffers; a filter that is coupled to the first multiplexer; a bypass delay circuit that is coupled to the first multiplexer; and a second multiplexer that is coupled to the filter and the bypass delay circuit.

In accordance with the present invention, the filter further comprises: a multiply-accumulate (MAC) circuit that is coupled between the first and second multiplexers; and a coefficient circuit that is coupled to the MAC circuit.

In accordance with the present invention, the coefficient circuit further comprises: a first coefficient generator; a second coefficient generator; and a third multiplexer that is coupled to the first and second coefficient generators and the MAC circuit.

In accordance with the present invention, the apparatus further comprises a bypass enable table that is configured to control the second multiplexer.

In accordance with the present invention, an apparatus is provided. The apparatus comprises an input circuit; a compression circuit having a plurality of wavelet transform circuits, wherein each wavelet transform circuit includes: an addressing circuit; a bypass enable circuit having a bypass enable table; a memory circuit that is coupled to the addressing circuit; a plurality of wavelet circuits coupled in series within one another in a sequence, wherein the first wavelet circuit of the sequence is coupled to the input circuit, and wherein the last wavelet circuit of the sequence is coupled to the memory circuit, and wherein each wavelet enable circuit includes: a demultiplexer; a plurality of sample buffers, wherein each sample buffer is coupled to the demultiplexer; a first multiplexer that is coupled to each of the sample buffers; a filter that is coupled to the first multiplexer; a bypass delay circuit that is coupled to the first multiplexer; and a second multiplexer that is coupled to the filter, the bypass delay circuit, and the bypass enable circuit, wherein the second multiplexer is configured to be controlled by the bypass enable table; and an output circuit that is coupled to the memory circuit.

In accordance with the present invention, each position in the sequence corresponds to at least one of a plurality of levels of a wavelet tree, and wherein the number of sample buffers in each wavelet circuit corresponds to its level in the wavelet tree.

In accordance with the present invention, the addressing circuit further comprises: a first incrementing counter that is coupled to the memory circuit; an address remap table circuit that is coupled to the memory circuit; and a second incrementing counter that is coupled to the address remap table circuit.

In accordance with the present invention, the output circuit further comprises a quantizing circuit.

In accordance with the present invention, the input circuit further comprises: an analog front end (AFE) having a plurality of channels; a discrete cosine transform (DCT) circuit that is coupled to each of the channels and that is coupled to the compression circuit.

In accordance with the present invention, the input circuit further comprises an ultrasonic wand that is coupled to the AFE, and wherein the bypass enable table corresponds to the ultrasonic wand.

In accordance with the present invention, a method is provided. The method comprises receiving image signals from transducers in an ultrasonic wand; digitizing the image signals so as to produce digitized image signals; compressing the digitized image signal using a wavelet tree having a plurality of levels so as to generate a compressed signal, wherein the configuration of the wavelet tree corresponds to the ultrasonic wand, and wherein processing is performed at each level by: demuliplexing its input signal to generate a demultiplexed input signal; applying the demultiplexed input signal to at least one of a plurality of sample buffers, wherein the number of sample buffers corresponds to its level; multiplexing outputs from the sample buffers to generate a multiplexed output signal; filtering the multiplexed output signal to generate the filtered signal; delaying the multiplexed output signal to generate a delayed signal; and selecting between the filtered signal and the delayed signal based on the configuration of the wavelet tree; and quantizing the compressed signal.

In accordance with the present invention, the step of filtering further comprises: selecting at least one set of coefficients of a plurality of sets of coefficients; and performing a multiply-accumulate operation using the selected set of coefficients on the multiplexed output signal to generate the filtered signal.

In accordance with the present invention, the method further comprises applying a DCT to digitized image signals prior to the step of compressing.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
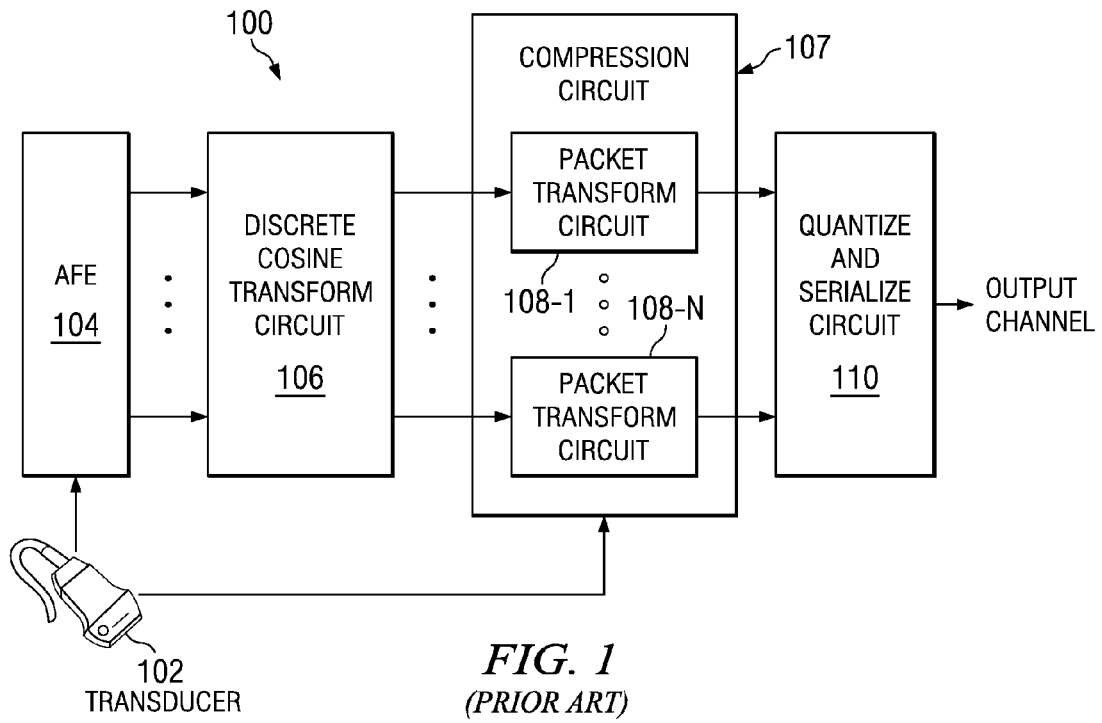
FIG. 1 is a diagram of an example of a portion of a conventional ultrasound diagnostic system.
Figure 2:
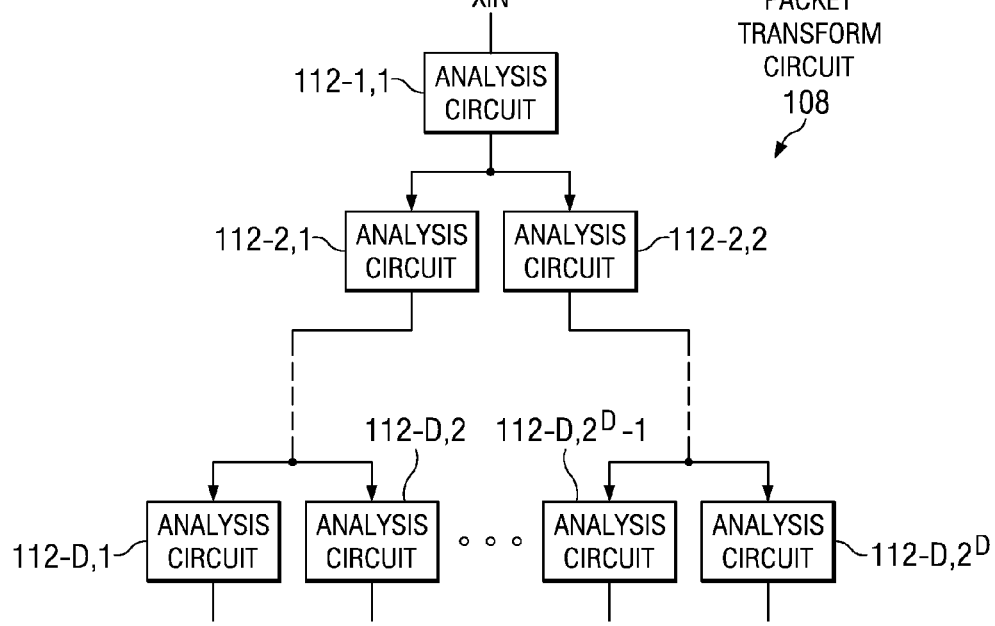
FIG. 2 is a diagram of an example of the packet transform circuit of FIG. 1.
Figure 3:
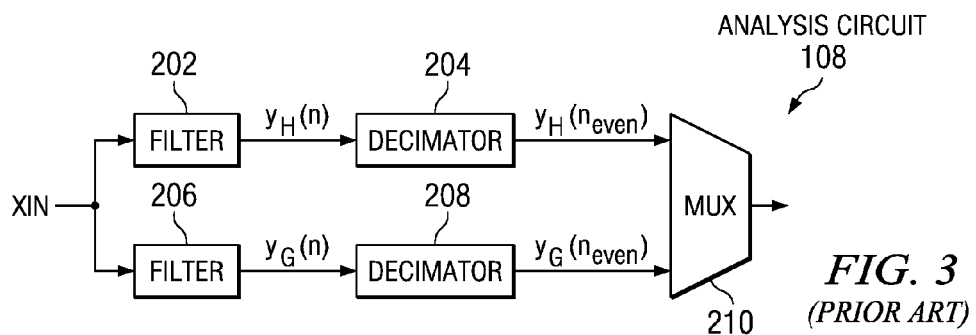
FIG. 3 is a diagram of an example of an analysis circuit of FIG. 2.

Refer now to the drawings wherein depicted elements are, for the sake of clarity, not necessarily shown to scale and wherein like or similar elements are designated by the same reference numeral through the several views.

Figure 6:
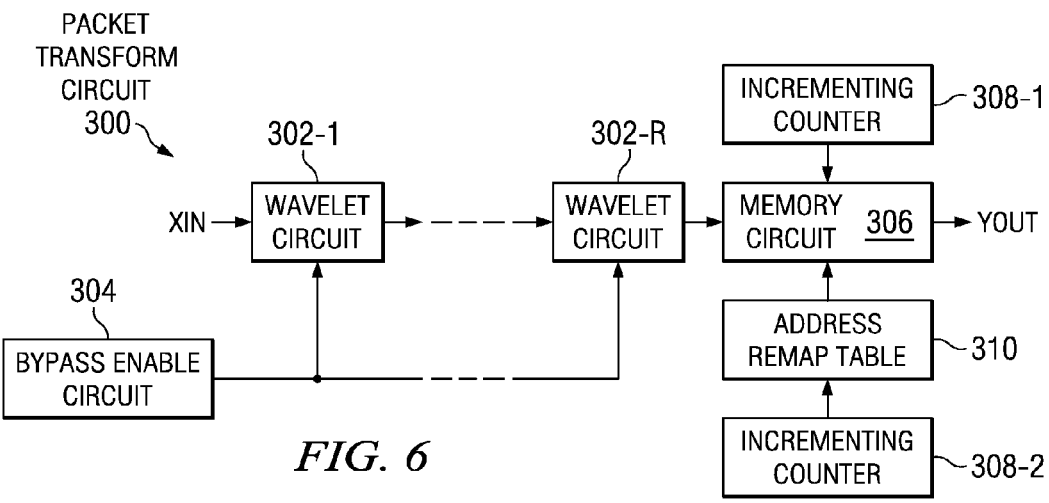
FIG. 6 is a diagram of an example of a packet transform circuit in accordance with the present invention.

Turning to FIG. 6, an example of a packet transform circuit 300 in accordance with the present invention can be seen. This circuit 300 can replace the packet transform circuits 108-1 to 108-N in system 100 and is generally comprised of wavelet circuits 302-1 to 302-R that are coupled in series with one another in a sequence so that each can function as a level of a wavelet tree. The configuration for the wavelet tree for circuit 300 is generally achieved by application of a bypass enable table (which is labeled 412 in FIG. 7) within bypass enable circuit 304. The bypass enable circuit 304 can detect the configuration for transducers 102 (e.g., wand) or be instructed as so and can select the appropriate wavelet tree configuration. The wavelet circuits 302-1 to 302-R operate in a recursive manner storing output values from the wavelet tree in memory circuit 306 (which can, for example, be a static random access memory (SRAM) and/or a dual ported memory circuit). Addressing for the memory circuit 306 can then be accomplished by use of an addressing circuit (which generally comprises incrementing counters 308-1 and 308-2 and address remap table circuit 310).

Figure 7:
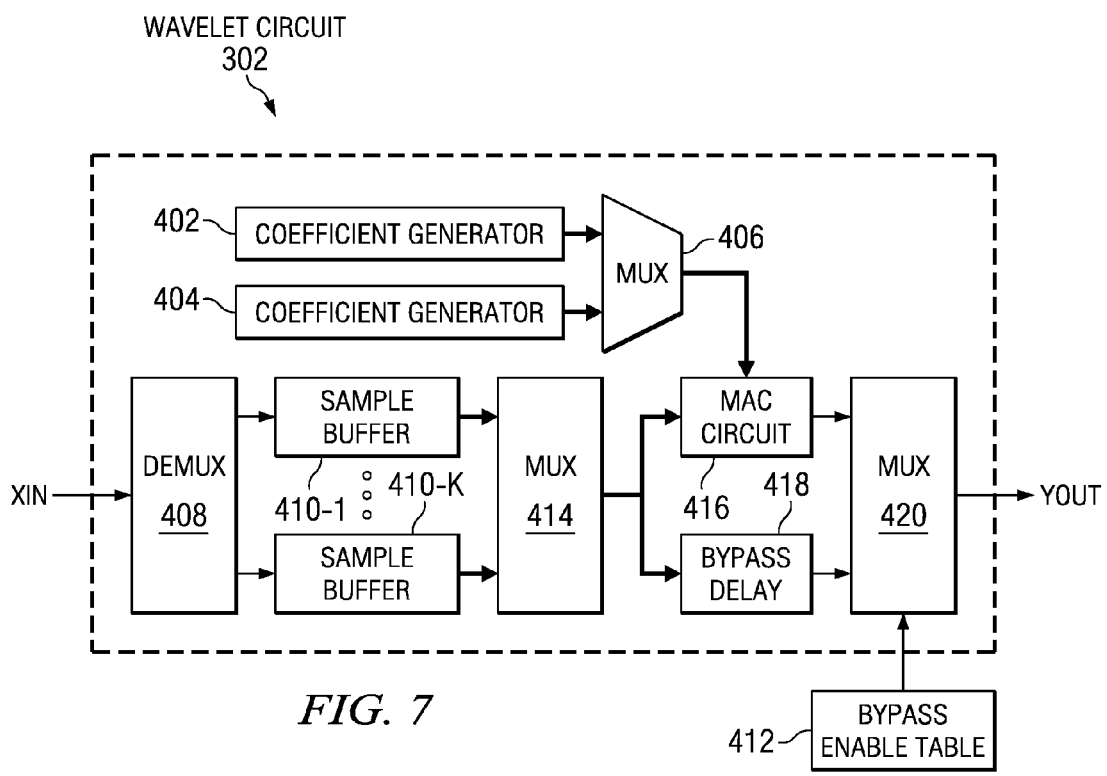
FIG. 7 is a diagram of an example of the wavelet circuit of FIG. 6.
Figure 4:
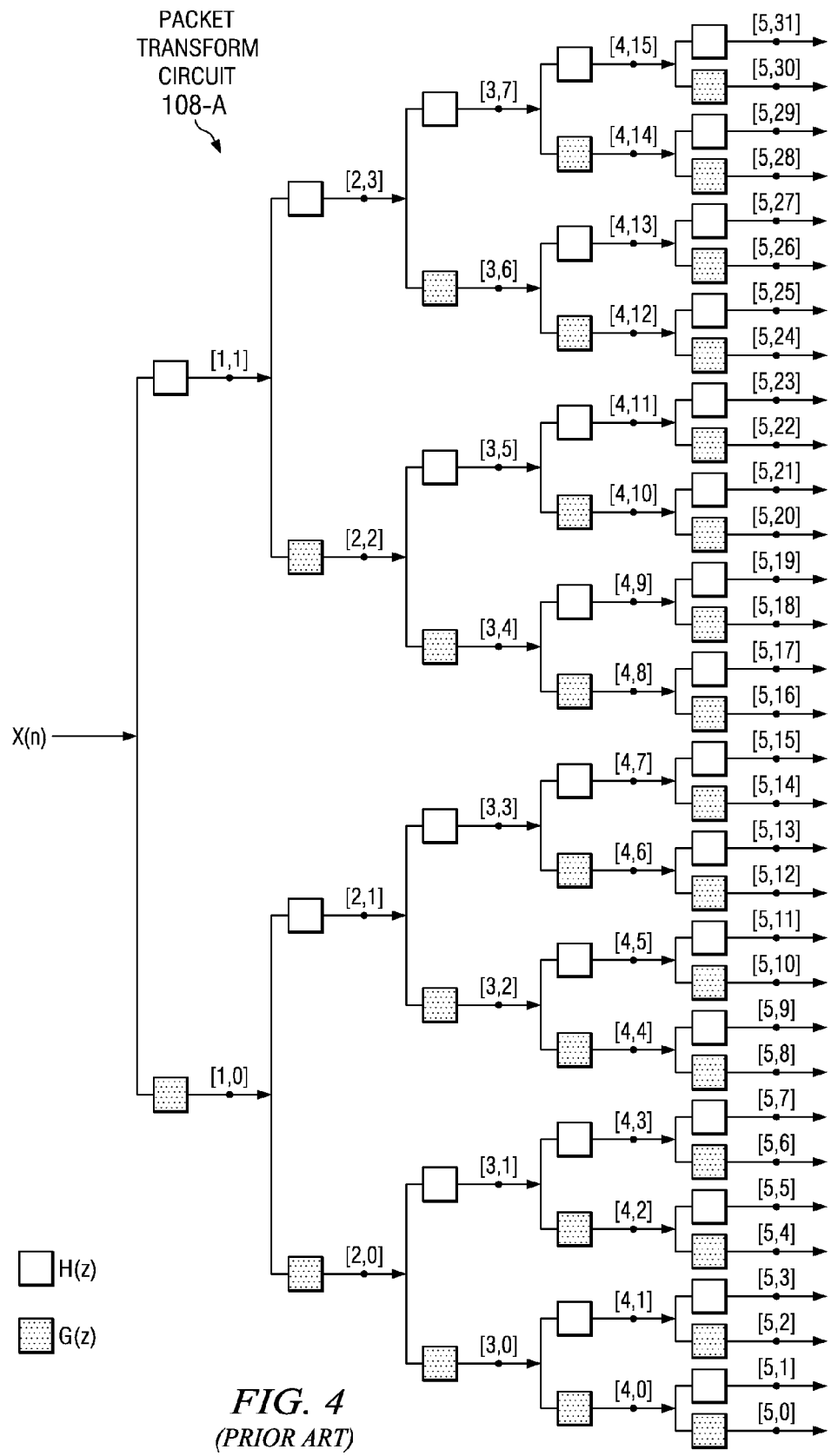
FIGS. 4 and 5 are diagrams of example wavelet tree configurations for the packet transform circuit of FIGS. 1 and 2.

In FIG. 7, the wavelet circuits 302-1 to 302-R (which are labeled 302) can be seen in greater detail. As shown, an input signal XIN is applied to a demultiplexer 408, and the demultiplexed signal is applied to the appropriate sample buffer 410-1 to 410-K. The sample buffer 410-1 to 410-K can have multiple taps to hold common input samples, and the number of sample buffers (e.g., K) generally corresponds to its position in the sequence. Typically, the number of sample buffers (e.g., K) can be $2^{level-1}$. For example, for a five level tree, the fourth wavelet circuit (e.g. 302-4) in the sequence could have 8 sample buffers (e.g., 410-1 to 410-8). The output from the sample buffers 410-1 to 410-K can then be multiplexed (by multiplexer 414) and applied to circuits 416 and 418. Multiply-accumulate (MAC) circuit 416 can operate as the filter for the level, capable of performing the functions of filters 202 and 206. This can be accomplished because coefficient circuit is able to apply (through multiplexer 406) H(z) filter coefficients (from coefficient generator 402) and G(z) filter coefficients (from coefficient generator 404) to MAC circuit 416. The bypass delay circuit 418 can provide the samples downstream (with an applied delay) when no filtration (i.e., by MAC circuit 416) is desired. Selection of filtration (from MAC circuit 416) or bypass (from bypass delay circuit 418) is accomplished by multiplexer 420 (which itself is controlled by the bypass enable table 412 within bypass enable circuit 304).

Figure 5:
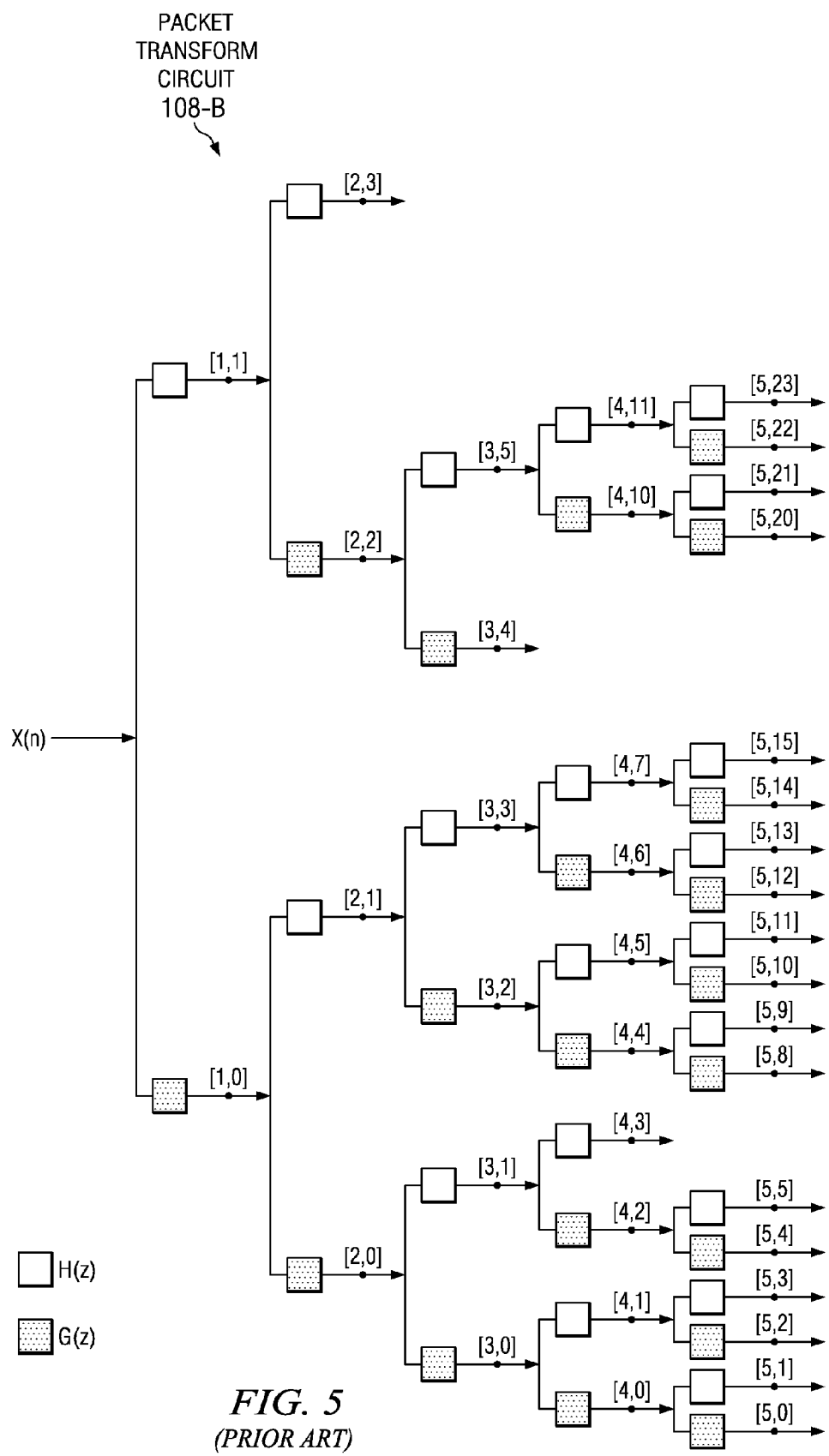
Figure 8:
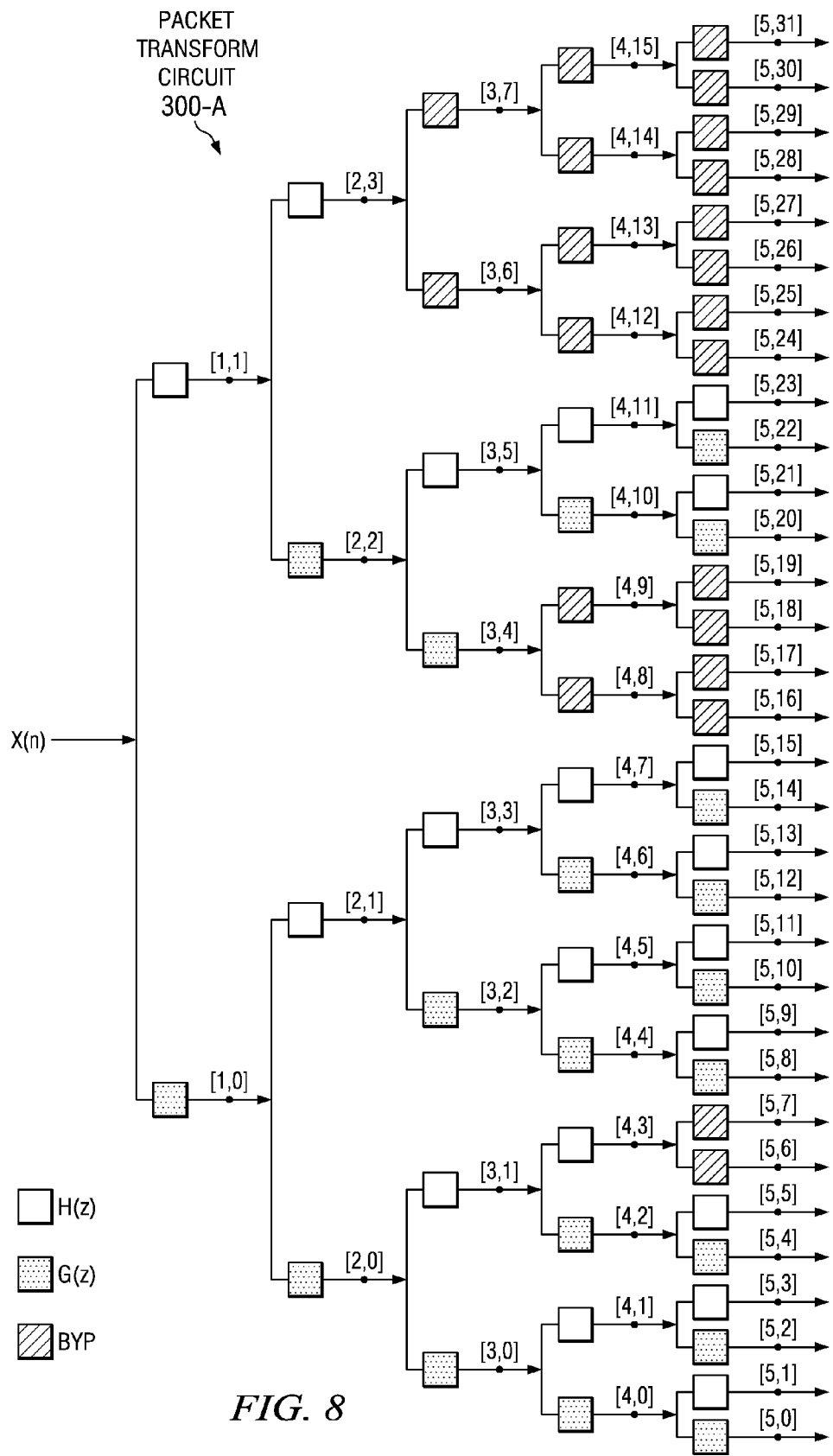
FIG. 8 is a diagram of a wavelet tree configuration for the packet transform circuit of FIG. 6.

In FIG. 8, an example of a wavelet tree for circuit 300 (labeled 300-A) can be seen. Circuit 300-A has the appearance of a full wavelet tree, meaning that there is proper data "alignment," but circuit 300-A is a partial wavelet tree (having the same configuration as the wavelet tree shown in FIG. 5). As shown, the bypass delay circuit 418 (labeled BYP) is used in place of the missing branches. Therefore, circuit 300 can be programmed to accommodate many configurations of transducers 102 (e.g., wands).

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   an input circuit;
   a compression circuit having a plurality of wavelet transform circuits, wherein each wavelet transform circuit includes:
      an addressing circuit;
      a bypass enable circuit having a bypass enable table;
      a memory circuit that is coupled to the addressing circuit;
      a plurality of wavelet circuits coupled in series within one another in a sequence, wherein the first wavelet circuit of the sequence is coupled to the input circuit, and wherein the last wavelet circuit of the sequence is coupled to the memory circuit, and wherein each wavelet enable circuit includes:
         a demultiplexer;
         a plurality of sample buffers, wherein each sample buffer is coupled to the demultiplexer;
         a first multiplexer that is coupled to each of the sample buffers;
         a filter that is coupled to the first multiplexer;
         a bypass delay circuit that is coupled to the first multiplexer; and
         a second multiplexer that is coupled to the filter, the bypass delay circuit, and the bypass enable circuit, wherein the second multiplexer is configured to be controlled by the bypass enable table; and
   an output circuit that is coupled to the memory circuit.

2. The apparatus of claim 1, wherein the filter further comprises:
   a MAC circuit that is coupled between the first and second multiplexers; and
   a coefficient circuit that is coupled to the MAC circuit.

3. The apparatus of claim 2, wherein the coefficient circuit further comprises:
   a first coefficient generator;
   a second coefficient generator; and
   a third multiplexer that is coupled to the first and second coefficient generators and the MAC circuit.

4. The apparatus of claim 3, wherein each position in the sequence corresponds to at least one of a plurality of levels of a wavelet tree, and wherein the number of sample buffers in each wavelet circuit corresponds to its level in the wavelet tree.

5. The apparatus of claim 4, wherein the addressing circuit further comprises:
   a first incrementing counter that is coupled to the memory circuit;
   an address remap table circuit that is coupled to the memory circuit; and
   a second incrementing counter that is coupled to the address remap table circuit.

6. The apparatus of claim 5, wherein the output circuit further comprises a quantizing circuit.

7. The apparatus of claim 6, wherein the input circuit further comprises:
   an analog front end (AFE) having a plurality of channels;
   a discrete cosine transform (DCT) circuit that is coupled to each of the channels and that is coupled to the compression circuit.

8. The apparatus of claim 7, wherein the input circuit further comprises an ultrasonic wand that is coupled to the AFE, and wherein the bypass enable table corresponds to the ultrasonic wand.

* * * * *